United States Patent
Astretsov et al.

(10) Patent No.: US 10,776,366 B1
(45) Date of Patent: Sep. 15, 2020

(54) COMPUTER-IMPLEMENTED METHOD AND SYSTEM FOR WRITING AND PERFORMING A DATA QUERY

(71) Applicant: ALATION INC., Redwood City, CA (US)

(72) Inventors: Sergey Astretsov, San Francisco, CA (US); David Crawford, San Francisco, CA (US); Venkatesh Ganti, Cupertino, CA (US); Aaron Kalb, San Francisco, CA (US); Jake Magner, Berkeley, CA (US); Minjoon Park, San Jose, CA (US); Satyen Sangani, San Carlos, CA (US)

(73) Assignee: Alation Inc., Redwood City, CA (US)

( * ) Notice: Subject to any disclaimer, the term of this patent is extended or adjusted under 35 U.S.C. 154(b) by 1122 days.

(21) Appl. No.: 15/164,318

(22) Filed: May 25, 2016

(51) Int. Cl.
*G06F 16/2457* (2019.01)
*G06F 16/2453* (2019.01)
*G06F 16/332* (2019.01)

(52) U.S. Cl.
CPC .. *G06F 16/24578* (2019.01); *G06F 16/24534* (2019.01); *G06F 16/24573* (2019.01); *G06F 16/3322* (2019.01)

(58) Field of Classification Search
CPC .................. G06F 16/3322; G06F 16/24578
See application file for complete search history.

(56) References Cited

U.S. PATENT DOCUMENTS

| | | | |
|---|---|---|---|
| 8,370,329 B2 | 2/2013 | Gutt et al. | |
| 8,447,775 B2 | 5/2013 | Vronay et al. | |
| 8,463,807 B2 | 6/2013 | Meiniel et al. | |
| 8,554,755 B2 | 10/2013 | Richardson et al. | |
| 9,031,949 B1* | 5/2015 | Pasca | G06F 16/951 707/736 |
| 10,198,511 B1* | 2/2019 | Gupta | G06F 16/951 |
| 2010/0076948 A1 | 3/2010 | Smithson et al. | |
| 2012/0084291 A1* | 4/2012 | Chung | G06F 16/14 707/741 |
| 2013/0086067 A1* | 4/2013 | Khoussainova | G06F 16/3325 707/737 |
| 2014/0280203 A1* | 9/2014 | Clark | G06F 17/2785 707/748 |
| 2015/0193498 A1* | 7/2015 | Weatherhead | G06Q 10/103 707/722 |

* cited by examiner

*Primary Examiner* — Charles E Lu
(74) *Attorney, Agent, or Firm* — Kanika Radhakrishnan; Evergreen Valley Law Group

(57) ABSTRACT

A computer-implemented method and system for searching over queries, writing and performing a data query. The computer-implemented method includes analyzing the query to understand elements described in the query. Further, the computer-implemented method includes extracting aliases for expressions to identify alternate names. Furthermore, the computer-implemented method includes allowing a user to annotate the elements. Moreover, the computer-implemented method includes establishing whether the query contains content for defining a new query, and if so, then enables writing a query according to a shorthand system.

18 Claims, 9 Drawing Sheets

| Press | Effect | Note |
|---|---|---|
| 1 ENTER | Insert SELECT⎵ | SELECT will be the top suggestion in the context of a new query |
| 2 * | | |
| 3 SPACE | | |
| 4 ENTER | Insert FROM⎵ | FROM will be the top suggestion after SELECT⎵*⎵ |
| 5 o | | (for orders) |
| 6 ENTER | Replaces o with purchases⎵ | after FROM, tables are suggested; the purchases table has the title "orders"; because purchases is commonly queried, it will be the top suggestion whose title begins with 'o' |
| 7 ENTER | Insert WHERE⎵ | WHERE will be the top suggestion after a table |
| 8 t | | (for tshirt) |
| 9 s | | |
| 10 ENTER | Insert typ_code = 45⎵ | 'ts' matches 't-shirt', yielding the suggestion for the full predicate (as described in the preceding pages) |
| 11 ENTER | Insert AND⎵ | AND will be the top suggestion after a predicate |
| 12 x | | |
| 13 l | | |
| 14 ENTER | Insert sz_code = 7⎵ | [same attribute > predicate principle] |
| 15 ENTER | Insert AND⎵ | |
| 16 b | | |
| 17 l | | (top hit matches "blue") |
| 18 DOWN | | (now the value "black" is selected) |
| 19 ENTER | Insert clr_code = 3⎵ | |
| 20 ; | | Done! |

FIG. 6

Users who ran query
dba, 03/012015 09:36:37 PST
johnSmith_marketing, 03/02/2015 19:26:00 PST
johnSmith_marketing, 03/05/2015 9:25:10 PST
johnSmith_finance, 03/06/2015 5:05:10 PST
debReynolds, 03/07/2015 8:45:08 PST

---

SELECT State, SUM (X+Y)
FROM Crevenue, Caddress ON Crevenue.CID= Caddress.CID
WHERE Crevenue.Status= 'closed'
GROUP BY Caddress.State

---

Tables
CRevenue
CAddress

Columns
CRevenue.Status
CRevenue.X
CRevenue. Y
Crevenue.CID
CAddress. State
CAddress.CID

Filters
CRevenue.Status= 'closed'

Join Predicates
Crevenue.CID=CAddress.CID

Grouping Columns
Caddress. State

Derived Columns
SUM(X+Y), Derived

FIG. 8

COMPUTER-IMPLEMENTED METHOD AND SYSTEM FOR WRITING AND PERFORMING A DATA QUERY

TECHNICAL FIELD

Embodiments of the disclosure relate generally to the field of data searching. Embodiments relate more particularly to allow users to write and edit queries much more easily than before, and also to allow the users to perform keyword searches over a collection of queries.

BACKGROUND

Database systems (also known as database management systems) are programs that enable users to store, modify and extract information from a database. A database is an organized collection of data, for example university data, tourism data and medical data. The most common database systems include MySQL, Microsoft SQL Server, Oracle, Sybase and IBM DB2. Typically, the database system is a collection of schemas, tables, queries, reports, views and other objects. For instance, a database of names and addresses might include entries including a resident's name, the name of the street of residence, the house number, the municipality, and a postal code such as the Zip Code in the United States.

Queries are the primary mechanism for retrieving information from the database, and are formulated with questions that are presented to the database in a predefined format. A greater number of database management systems use the Structured Query Language (SQL) standard query format. A query is a request for specific information from a database. For instance, the user may request all data entries in the database which satisfy the request.

Typically, there are three basic methods of querying. The first method involves choosing parameters from a menu. The menu guides a user to choose the parameters (characteristics), making it easy for the user. However, this method is not flexible.

The second method involves Query by Example (QBE) where the user is allowed to specify the fields and values that define the query. For instance, in a database of names and addresses, a database query might be directed to all residents living on a given street, specified in the query by name. If the street is long enough to run through multiple municipalities, the query might additionally specify residents on that street within a specified one of the municipalities.

The third method is a powerful tool that deals with query languages. A majority of database systems require the users to request in the form of a query written in a special query language. This method is complex as it requires the user to learn the specialized query language.

Further, for the user to write a query in a structured query language, the user must be aware of which tables contain the relevant information and the columns within those tables that contain the relevant values. This knowledge is difficult to attain in cases where the user has not designed the tables and neither knows a concerned person to ask. Consequently, the user needs to keep searching until the relevant table is found. This prolonged process of guessing may be unduly time-consuming, and may make the user frustrated.

Epigrammatically, the time required to write the query grows with a number of factors. The factors include the number of tables in the database, the number of columns in the tables and the number of possible alternatives for any given term.

In the light of the above discussion, there appears to be a need for a method and system for an easier way of writing queries.

OBJECT OF INVENTION

The principal object of the embodiments herein is to provide a method and system to allow users to write and edit queries much more easily than before.

Another object of the embodiments herein is to allow users to perform a keyword search over a collection of queries. The users search over other people's queries using keywords.

SUMMARY

The above-mentioned needs are met by a computer-implemented method and a system for writing and performing a data query.

An example of a computer-implemented method for searching over queries, writing and performing a data query includes analyzing the query to understand elements described in the query. Further, the computer-implemented method includes extracting aliases for expressions to identify alternate names. Furthermore, the computer-implemented method includes allowing a user to annotate the elements. Moreover, the computer-implemented method includes establishing whether the query contains content for defining a new query, and if so, then enables writing a query according to a shorthand system.

An example of a computer program product for searching over queries, writing and performing a data query includes analyzing the query to understand elements described in the query. Further, the computer program product includes extracting aliases for expressions to identify alternate names. Furthermore, the computer program product includes allowing a user to annotate the elements. Moreover, the computer program product includes establishing whether the query contains content for defining a new query, and if so, then enables writing a query according to a shorthand system.

An example of a system for searching over queries, writing and performing a data query includes a computing device. Further, the system includes a receiving module to receive a query written by a user of the computing device. Furthermore, the system includes a processor configured within the computing device to analyzing the query to understand elements described in the query, extracting aliases for expressions to identify alternate names, allowing a user to annotate the elements and establishing whether the query contains content for defining a new query, and if so, then enables writing a query according to a shorthand system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements.

These reference numerals are used in the detailed description to illustrate various embodiments and to explain various aspects and advantages of the present disclosure.

FIG. 6 is an exemplary representation of the number of key strokes to write a query, according to the embodiments as disclosed herein;

FIG. 8 illustrates an exemplary query associated with each of the objects in the query, according to the embodiments as disclosed herein.

DETAILED DESCRIPTION OF THE EMBODIMENTS

The above-mentioned needs are met by a method and system for writing and performing data queries. The following detailed description is intended to provide example implementations to one of ordinary skill in the art, and is not intended to limit the invention to the explicit disclosure, as one of ordinary skill in the art will understand that variations can be substituted that are within the scope of the invention as described.

The method described herein is applied over a data catalog (herein referred to as the "Alation Data Catalog". Typically, the Alation Data Catalog is a Social Data Catalog which contains a rich source of information about enterprise data and its usage by people in the enterprise.

Environment Block Diagram

Figure 1:
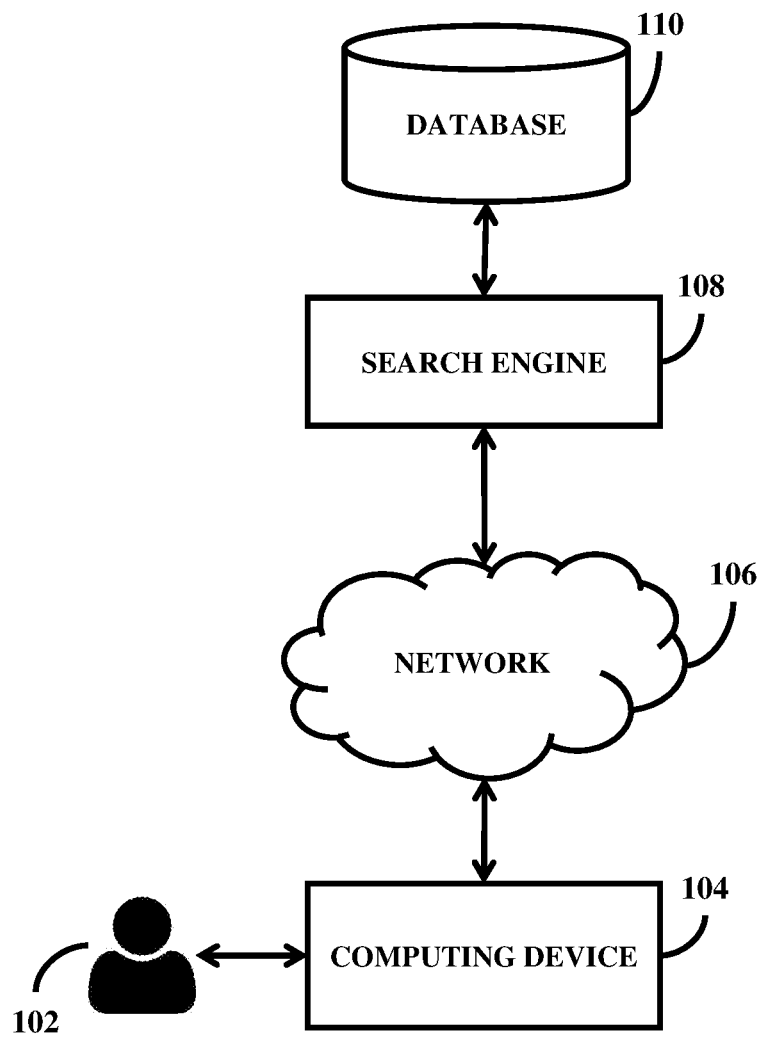
FIG. 1 is a block diagram of an environment, according to the embodiments as disclosed herein.

FIG. 1 is a block diagram of an environment, according to the embodiments as disclosed herein. The environment 100 includes a user 102 of a computing device 104, a network 106, a search engine 108 and a database 110.

Examples of the computing device 104 includes, but is not limited to, personal digital assistants, cellular telephones, smart phones, tablets and other similar computing devices. The computing device 104 is operated/owned by the user 102.

Further the computing device 104 is configured with a non-transitory computer-readable medium, the contents of which causes to perform the method disclosed herein.

Network link(s) involved in the system of the present invention may include any suitable number or arrangement of interconnected networks including both wired and wireless networks. By way of example, a wireless communication network link over which mobile devices communicate may utilize a cellular-based communication infrastructure. The communication infrastructure includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link may further include, or alternately include, a variety of communication channels and networks such as WLAN/Wi-Fi, WiMAX, Wide Area Networks (WANs), and Blue-Tooth.

The search engine 108 is a program that searches for and identifies documents/websites from a Data Catalog that correspond to keywords or characters specified by the user. At times, the search engine 108 retrieves information stored in the database 110. Examples of the search engine 108 include, but are not limited to, Google, Bing and Yahoo! Search. Each search engine 108 has its own method of searching information.

It should be appreciated by those of ordinary skill in the art that FIG. 1 depicts the computing device 102 and the search engine 108 in an oversimplified manner, and a practical embodiment may include additional components and suitably configured processing logic to support known or conventional operating features that are not described in detail herein.

The user 102 requires specific information from the database 110. As a result, the user 102 writes and edits queries much easier than before using the computing device 104. The users are also allowed to search other people's queries using specific keywords. The search is performed in real time and is advanced than traditional searches. Further, the search is performed across values and physical names of data objects. Additionally, the users are allowed to attach titles/labels and descriptions to all objects and values and subsequently perform a search over it as well.

Block Diagram of Computing Device

Figure 2:
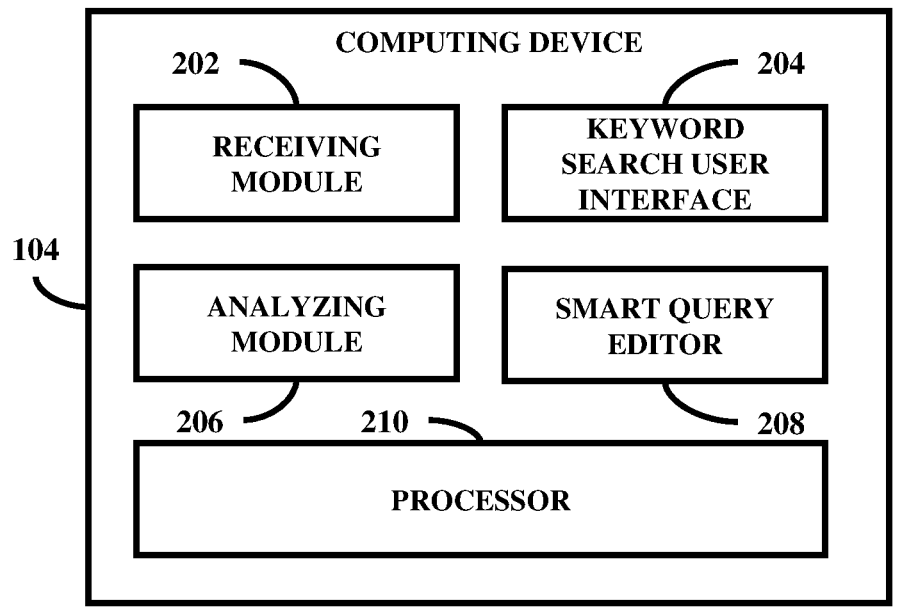
FIG. 2 is a block diagram of a computing device, according to the embodiments as disclosed herein.

FIG. 2 is a block diagram of a computing device, according to the embodiments as disclosed herein. The computing device 104 includes a receiving module 202, a keyword search user interface 204, an analyzing module 206, a smart query editor 208 and a processor 210.

The receiving module 202 receives queries from the user. The receiving module 202 may, for instance, include a user input interface, and a front-end processor for interpreting the user input as an electronic query function.

The keyword search user interface 204 to allow users to write data queries and interact with templates. It may include a keyboard, or a display with clickable icons, text menus and entries, Boolean operators, etc.

The analyzing module 206 analyzes the extracted query logs and helps bootstrap the system even without any prior usage of our query editor. A query log contains a log of queries that have been made to a database system. Thus, analysis of a query may begin by reading the query from the query log.

The smart query editor 208 allows the user to write and edit queries. It may include functionality similar to that of a word processor or text editor application.

The processor 210 is configured to access a stored software code program which may be in system memory or on a non-transitory computer-readable medium (content parsing algorithm), the software code program contents of which cause to perform the method disclosed herein.

Operational Flow Chart

Figure 3:
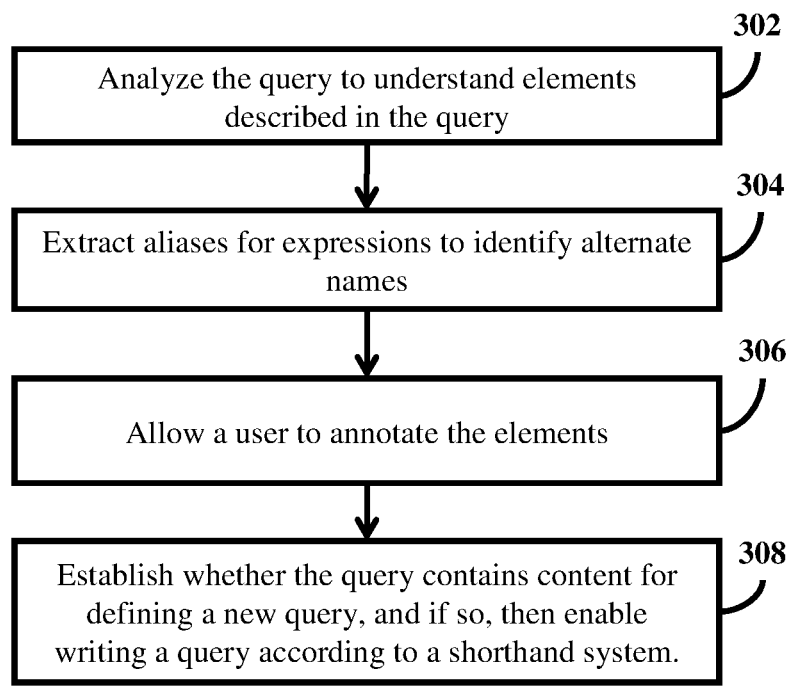
FIG. 3 is a flow diagram illustrating a method for writing and performing a data query, according to the embodiments as disclosed herein.

FIG. 3 is a flow diagram illustrating a method for writing and performing a data query, according to the embodiments as disclosed herein. The method begins at step 302.

At step 302, the query is analyzed to understand elements described in the query. The elements include schema, tables, attributes, attribute values, expressions, join predicates, filters, group by columns including ordering, having predicates, result columns (including expressions and aliases) described in the query. Each of these elements are extracted from the query.

A schema is the structure or organization of the database. Particularly, the schema defines the tables, the fields in each table and the relationships between fields and tables. A table has a specified number of columns and can have any number of rows. Attributes refer to characteristics of the table and hold values known as attribute values. Expressions in database systems enable the user to specify which information the user wants to see.

For a given user-specified query attribute, attributes which are commonly joined with the given query attribute are accessed. Referring again to the example of a database of names and addresses, a given municipality may have a given postal code associated with it.

Further, queries are collected into the Alation Catalog. The queries are collected from the smart query editor and system query logs and are subsequently analyzed. A search beyond logged queries is generalized wherein literals are selectively retained within the query for modification and for creation of a new template. Subsequently, the queries are matched to keywords that users tend to use. This includes document preparation by adding to the query, titles and descriptions of data objects, and tokens in names and titles. The queries and query templates are ranked by relevance. The ranking includes using token weights and query weights.

Basically, the query logs are analyzed to identify the following:
1. Frequencies of:
   a. Expressions
   b. Attribute value frequencies
   c. Attribute mention frequencies within queries
   d. Table mention frequencies within queries
   e. Schema mention frequencies
2. Relationships between
   a. Table sets
   b. Attribute sets
   c. Attribute values
   d. Users and tables
   e. Users and attributes
   f. Reports and users
   g. Expressions and aliases
3. Lineage
   a. Derivation relationships between tables/data sources:
      i. automatically derived from queries
      ii. Extract, Transform, Load (ETL) scripts
      iii. Ingested through API At step 304, aliases for expressions are extracted to identify alternate names. Aliases are extracted from queries in the log or written in the editor. For instance, a sql query "SELECT CustomerId, SUM(RevT.Pft+RevT.Cst) as Revenue FROM RevT as CustomerRevenue GROUP BY CustomerId" has two aliases: {SUM(RevT.Pft+RevT.Cst)→Revenue, RevT→CustomerRevenue}. Such alias extraction parses the queries in detail and then resolves all objects mentions in query with objects in the catalog. For example, FN as First name or SUM(X+Y) as Revenue. These aliases are used to derive synonyms. For the present purposes, an "alias" is defined as a word, expression, proper name, etc., which is synonymous with a term such as a query keyword. In an embodiment, a database query which specifies such a term should preferably capture database entries which use the alias, as well as those which use the specified term. "Extracting" the aliases means obtaining the aliases used in queries.

At step 306, a user is allowed to annotate the elements. A user can annotate these elements by their initiative via a user-interface to view and edit information about each data object. Additionally, applications can also annotate the elements via an API. Further, the query editor can also prompt the user to annotate elements (which have not been titled/described) that they are working with in the current context. The elements include data source, schema, table, attributes, attribute values, report, workbook/dashboard, query and expression. The user is allowed to annotate the elements with the following:
1. Title
2. Description
3. Up/Down notes
4. Endorsement/warning/deprecation—users can add annotations along with comments on any of the elements.
5. The user is allowed to add custom fields such as stewards/experts/owners/Data Quality Measure and populate them either manually or using an application programming interface (API).
6. Expert users
7. Top users
8. Data quality information where ever relevant.

At step 308, the query is established to check whether the query contains content for defining a new query. If so, then the query is written according to a shorthand system.

A given entry at a given point is a function of the user's data entry and the syntax of the query up to the given point.

Based on the Alation Catalog, the following methods are performed for searching specific information:

Keyword search methodology—used over the collected queries to allow users to search and understand other user's queries using keywords.

Search-driven query formulation—wherein the smart query editor allows users to edit and write queries.

Keyword Search Over Queries Methodology

The Alation catalog is also considered for enabling keyword searches over queries. Keyword search over queries methodology allows the user to perform search operation by physical names, by tokens in logical names and by synonyms of tokens in logical names.

The search requires three components to be well-defined.
1. Repository of documents to search over
2. Indexing Structures
3. Ranking Algorithm Generalization: An additional challenge is that of searching for queries which may not have been written yet. This is addressed by the generation of query templates and preparing documents to index the queries.

Generally, a large set of queries are collected from the smart query editor and extracted from the database system's query logs. All queries that are executed by the database system are periodically extracted from the database query log tables. A majority of the databases store the executed queries along with the user's names who executed the queries and details of the query execution.

Keyword search over queries methodology combines common queries (and predicates) into one template as query and predicate template, which allows the user to search for "new/unseen" queries, based on past query patterns. A query template is one which when instantiated fully results in an executable query. To "instantiate" a query template means to insert keywords, values, etc., for each variable. For example, 'select age, gender, count (*) from customer_demographics where region=$1 group by age, gender'. For instance, if "region=$1" is a predicate for the region of the state of California, then instantiating this query template would include replacing region=$1 with California or an appropriate alphanumeric code based on the data semantics. Similarly, a predicate template are those which when instantiated results in a part of a query. For example, a predicate "region=$1" might represent a keyword denoting a particular geographic region, such as "California". In some embodiments, instantiated queries may not be present in the query log or in the catalog. New queries may be made by "generating templates" and then "instantiating" values for templates based on a user's search.

The creation of a template replaces all literals in a query with variables. However, the literals that can be retained without replacing it with variables, is automatically determined. Especially, literals that don't vary as often may not be replaced with variables while generating templates. The user can modify an existing template and create a new template. Further, a new template is created with literals that do not change over a specific time period upon execution.

Each query is associated with each of the objects in the query (tables, columns, filters, join predicates, derived columns, values, etc.). These associations are used for preparing a searchable/indexable document.

Each object (tables, columns and derived columns) in the database (for instance, schema, table, column (pre-defined or derived), value, filters and join predicates) are described in human understandable terms. For example, a schema "CRV" is "Customer Revenue" database and a table "RevT" is titled as "Revenue of Customers" and so on. Similarly, a derived column such as "Rev-Cst" is titled as "Customer Profit". Such data dictionaries are "ingested" and associated with each table/column with their logical titles and descriptions. The logical descriptions of the objects are also deduced from the aliases used in queries that are ingested.

In keyword search over queries methodology, documents are prepared to index queries such that they match the keywords to be used, enabling search over the templates. Each document is composed of query text and user profiles. The query text includes tokens from the physical names of tables, attributes and so on. Some queries are titled and well-described specifically when authored in the Alation query editor. Further, profiles of user's who have been authored and interacted with the query in other ways are included in the document. Additionally, the following components are also included in the document:

1. Titles and descriptions of data objects mentioned in the query. The data objects include tables, attributes, predicates and attribute values.
2. Snippets of query.
3. Propagated aliases that were used for data objects in other queries. Consider the following queries:
    Q1: 'SELECT SUM(X+Y) as Revenue FROM CRevenue as Customer_Revenue' and
    Q2: 'SELECT State, SUM(X+Y) FROM CRevenue, CAddress on CRevenue.CID=CAddress. CID group by CAddress.State'
    Here, by propagating aliases 'Revenue' and 'Customer_Revenue' to the expression SUM (X+Y) and CRevenue, respectively from Q1 and Q2, Q2 can now be found when a user searches for [Customer Revenue by State].

Further, documents are enhanced for query templates with the following information:

1. Attribute values that could be used to instantiate template parameters and
2. Tokens in physical names or logical titles of the attribute values that could instantiate template parameters.

The query-object association and logical title/descriptions of objects supports keyword search over queries based on the keywords in the logical titles/descriptions of the objects (tables, columns, filters, . . . ) involved. For instance consider, a sql query "select * from CRV.RevT where sc_code in (1, 5, 9, 11)"
    Here, CRV is "Customer Revenue", RevT is "Revenue of customers", and consider that sc_code in (1, 5, 9, 11) is "northeast states". Now, if a user's keyword search query is [revenue northeast], the above sql query is matched for this keyword query.

Further, in keyword search over queries methodology inverted index structure is employed over the prepared documents.

Keyword search over queries methodology includes ranking, where the prepared documents (corresponding to either queries or query/predicate templates) are ranked based on token weights or query/template weights, returning the most relevant queries or query templates to a user's query.

Search-Driven Query Formulation

The search-driven query formulation automatically suggests query snippets based on current context, prefix of tokens and keyword search for predicates or templates. A "predicate" means, for the purposes of the present subject matter, an expression which is defined as having a synonymous meaning with a search keyword which a user might use in a query, and whose syntax may be defined so as to represent a class of keywords in a standardized manner. For instance, keywords for colors might be familiar color terms such as "black," "blue," "red," etc. Predicates for such keywords might have a syntax such as "clr_code=#" where clr_code is an abbreviation for "color code," and the # represents an index number, whose various values correspond with different keywords within the class. For example, if the index number 3 corresponds with the color black, then "clr_code=3" might be a predicate for the keyword "black." On-the-fly suggestions can be further narrowed down by allowing the user to search with prefixes or tokens in physical names and in logical names. Further, the search-driven query formulation shows previews, endorsements, warnings, comments, top users, expert users and other relevant information about the objects being suggested and used in the current query.

The search-driven query formulation implements ranking of auto suggestion using:

1. Popularity/frequency of attributes, tables, attribute values, expressions.
2. Co-mention frequency of table-table, table-attribute, attribute-attribute, expression-attribute, expression-table, expression-expression.
3. Frequency of mention that is specific to each user.

In the search-driven query formulation the content of the suggestion menu is automatically filtered by context (for example, which tokens precede and follow the cursor, which tables and attributes have been mentioned so far and so on), sorted by anticipated relevance (based on the usage patterns of the user and peers), and can be searched explicitly (over physical names as well as human-annotated labels).

The search-driven query formulation algorithms include pre-materializing the index, per-schema materialization and personalization (by relevant schemas) per user and on-thefly suggestions. Here, the search is leveraged over queries and snippets of queries to enable a lot of the functionality.

In the pre-materialization algorithm of the search-driven query formulation, predicates are materialized along with auto-generated titles (as mentioned is paragraph [0046]) and are indexed. These predicates are marked as auto-generated; and whenever the user edits on the title or on the predicate text, an auto-generated flag is reset. Materializing the predicates is advantageous in several ways as listed below:
1. It is easier to add new sophisticated classes of predicates as they can be materialized offline.
2. Titles can also be generated offline.
3. It is treated the same way as any other predicate.
4. Can also be a part of the Alation catalog.

On-the-fly suggestions algorithm of the search-driven query formulation, generates suggestions based on the context during compose time. Therefore, it is beneficial, as suggestions can be more relevant.

The challenge is which part of the index should be on the server and which parts should be on the client browser. The method described herein relies on pre-computation and partitioning the index into multiple chunks. This approach has two advantages: i) Graceful experience ii) a quick start where the user doesn't need to wait for all of the indexes to be downloaded before she gets any recommendations.
1. The method described herein splits the index into multiple pieces:
   a. By suggestion types (for instance, columns, tables, filters, joins, values)
   b. By schema
2. When the user starts using the query editor, tables and columns indexes for the schemas most commonly used by the user are displayed. In some embodiments, additional indexes are displayed progressively based on availability of RAM.

Consider that the user has typed in a query as follows:
SELECT * FROM purchases WHERE
and then the user types 'blac' from a menu list of specified colors.

The method described herein finds the value of 'black' in the table 'colors' and traces back the foreign key relationship to purchases. Subsequently, the entire string is suggested to the user: A query expression, in appropriate syntax, might be as follows:
clr_code=3/*black*/

In other words, as the user types keywords while writing queries, predicates are prepared and instantiated. For instance, clr_code=3 when the user types "black" and typ_code IN (44, 89, 102, 113) when the user types "footwear".

Typically, relationships are deduced from declared foreign keys and are stored in the query log. In addition to the foreign key relationships, other relationships from a catalog (known as the 'Alation catalog') are used. Related attributes which are commonly joined with the current attribute in context is also referred. The joining attributes which are tagged as "enumerated" in the Alation Catalog are also prioritized and includes a "descriptive" attribute. For example, purchases.clr_code may commonly be joined with the ClrDescr.Code attribute of the ClrDescr table. The ClrDescr table holds the schema as [Code, Descr].

The method ends at step 308.

The method described in FIG. 3 is specifically beneficial for the following reasons:
1. The entire process of writing queries is much faster than traditional methods.
2. The method eliminates the need to have multiple tabs open.
3. The method eliminates the need to enquire with colleagues or store attribute values in mind.
4. The method eliminates the requirement of pre-queries.
5. With context, sorting, searching and previewing, the user can write a query easily in one pass.
6. The presence of a trie index on the client device (which is shipped from the server) avoids network delays in suggestions in the smart query editor.

Figure 4:
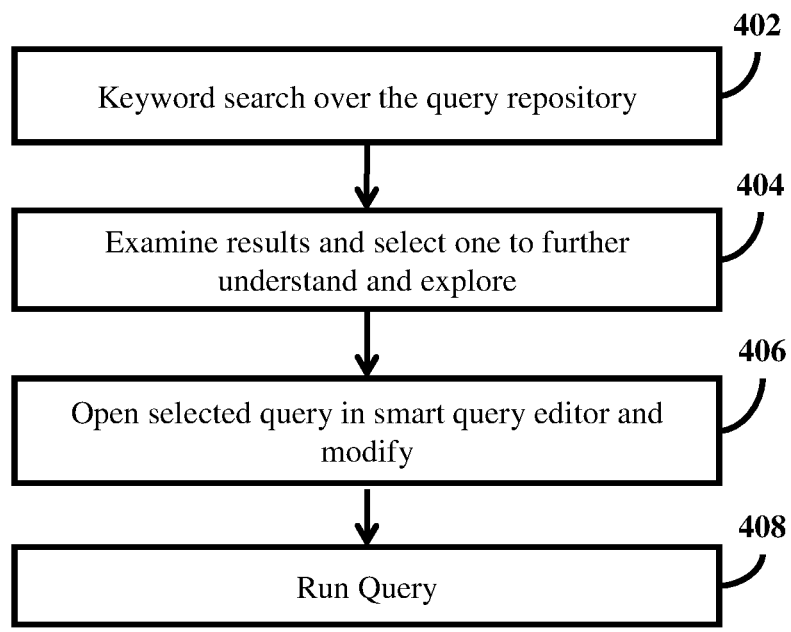
FIG. 4 is a flow chart illustrating a method for keyword search over queries, according to the embodiments as disclosed herein.

FIG. 4 is a flow chart illustrating a method for keyword search over queries, according to the embodiments as disclosed herein. The method begins at step 402.

At step 402, a keyword search is performed over the query repository.

At step 404, results are examined and one result (query) is selected to further understand and explore.

At step 406, the selected query is opened in smart query editor and modify.

At step 408, the query is executed.

The method ends at step 408.

Exemplary Representation of Tables in a Database

Figure 5:
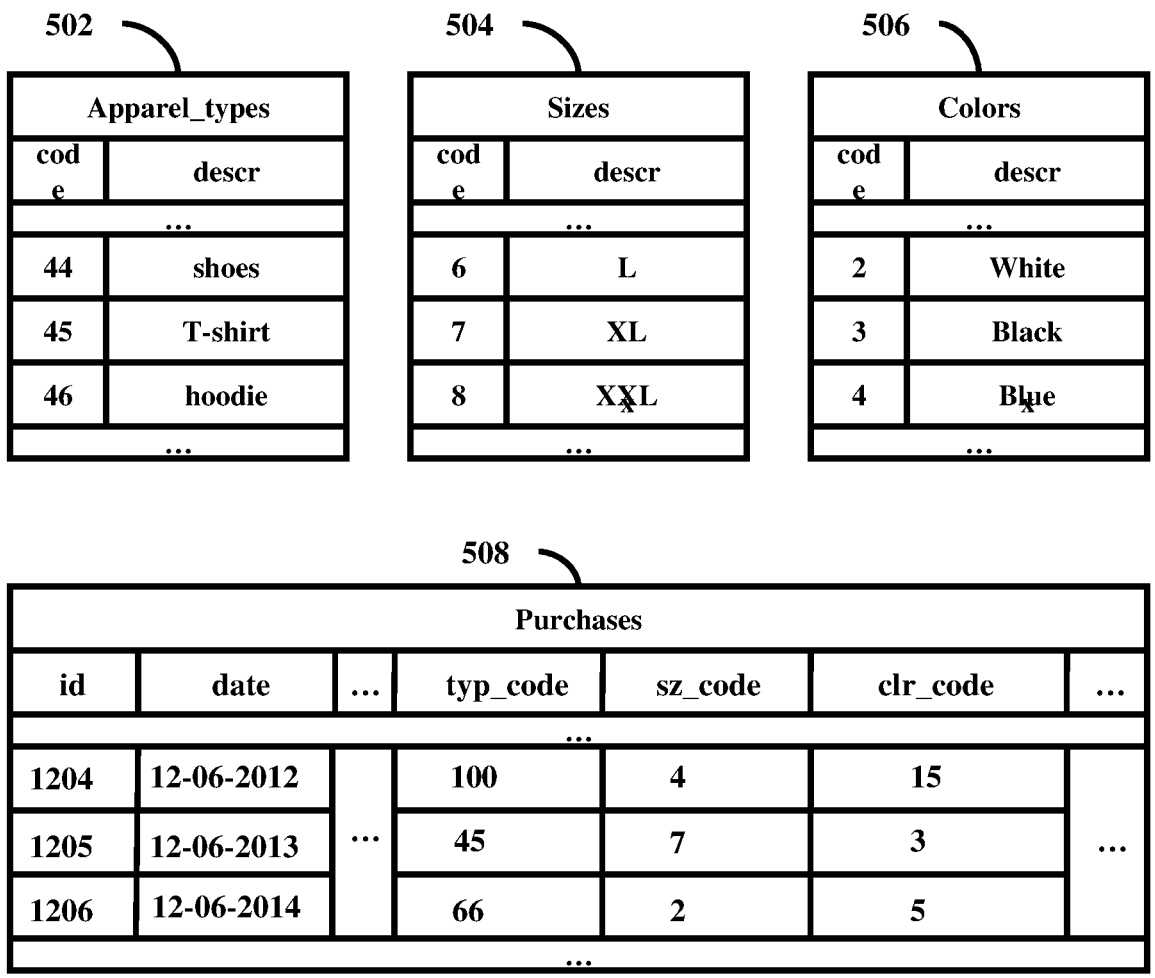
FIG. 5 is a schematic representation of exemplary tables and data stored in a database, according to the embodiments as disclosed herein.

FIG. 5 is a schematic representation of exemplary tables and data stored in a database, according to the embodiments as disclosed herein. While a database of names and addresses was briefly mentioned above, here a database of garments will be examined in more detail.

The tables are defined as Apparel_types 502, Sizes 504, Colors 506 and Purchases 508. Further, the tables Apparel_types 502, Sizes 504, Colors 506 include attributes 'code' and 'descr'. The attribute values for the table Apparel_types 502 includes '44 shoes', '45 T-shirt' and '46 hoodie'. Similarly, the attribute values for the table Sizes 504 includes '6 L', '7 XL' and '8 XXL'. Further, the attribute values for the table Colors include '2 White', '3 Black' and '4 Blue'.

The table Purchases 508 include attributes 'id', 'date', 'typ_code', 'sz_code' and 'clr_code'. The attribute values are listed below, for example '1204', '12-06-2012', '100', '4', '15'.

Exemplary Representation of Key Strokes to Write a Query

FIG. 6 is an exemplary representation of the number of key strokes to write a query, according to the embodiments as disclosed herein.

This functionality relies on the ability to "search" for snippets of queries. The search is based on (a) context of the partially typed query, (b) user's context (team/org), (c) current cursor context (partially typed tokens).

Consider the normal method to write a query as shown below:
SELECT * FROM purchases WHERE typ_code=45 AND sz_code=7 AND clr_code=3.

With the method described herein, the same query is written using twenty key strokes as shown in FIG. 6 thereby making it easier and faster for the user to write the query. In FIG. 6, the middle column "Effect" represents the elements of the written query; that is, the query can be understood by reading down the Effect column: SELECT FROM purchases WHERE t-shirts AND extra large size AND black.

The left column represents user keystrokes. The keystrokes relate to predetermined query syntax. Accordingly, the keystroke sequence follows the query syntax from beginning to end, and a given keystroke at a given point within the query is interpreted to have a meaning which corresponds with the parameter value, Boolean operator, etc., which is called for at that point in the query.

Thus, a relatively small number of distinct shorthand keystrokes may build an elaborate query. Note, for instance, the number of ENTER keystrokes in the Press column, and the various meanings given in the Effect column, depending on where we are in the query syntax. Notice also the abbreviations (such as "ts" for t-shirt), and the DOWN keystroke for scrolling through a menu of colors. Either product abbreviations (such as "ts" for t-shirt), or DOWN and UP strokes through a menu of options for a given parameter, may be used.

Process Block Diagram

Figure 7:
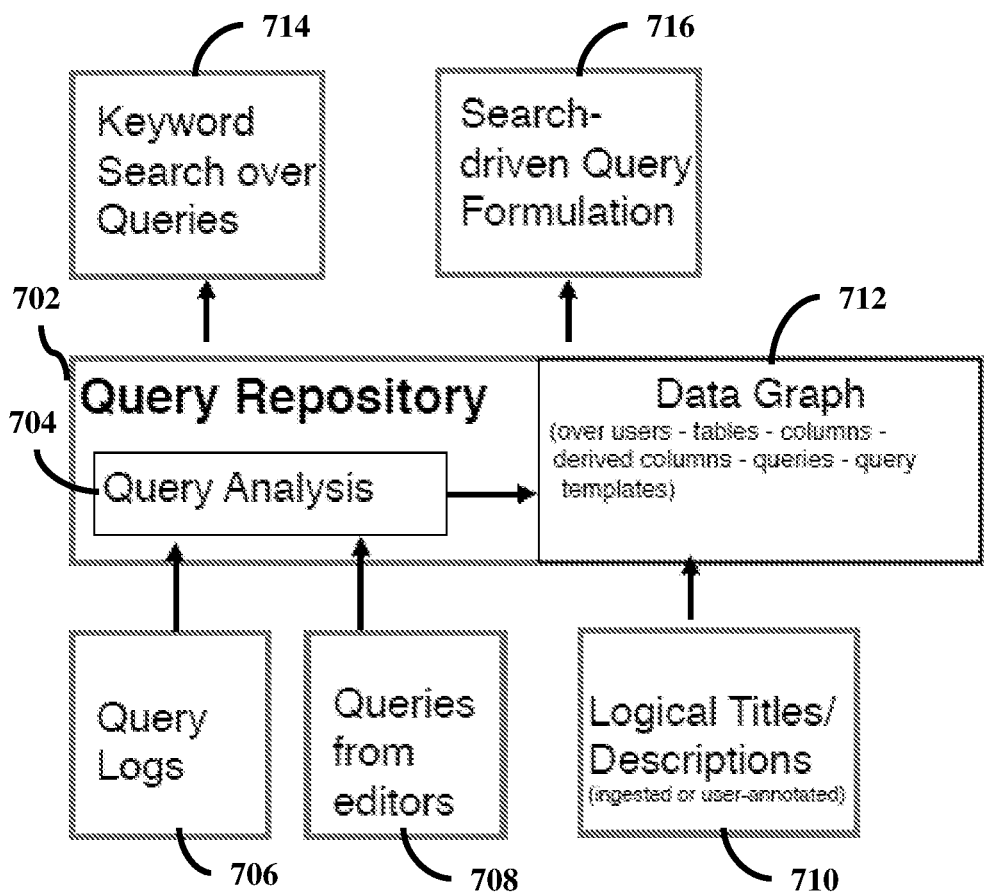
FIG. 7 is a block diagram of the process for writing and performing a data query, according to the embodiments as disclosed herein.

FIG. 7 is a block diagram of the process for writing and performing a data query, according to the embodiments as disclosed herein.

The block diagram illustrates the Query Repository 702 that performs query analysis 704. Relevant phrases that can be used to describe snippets of a query are auto-generated based on the analysis performed over Query Logs 706 and Queries from editors 708.

Logical Titles/Descriptions 710 are ingested or can be user-annotated and are used to create data graphs 712.

As described in FIG. 3, specific information can be searched using two methods, Keyword Search over Queries 714 and Search-driven Query Formulation 716. Both the methods support two types of search queries. The Keyword Search over Queries 714 performs over the query repository. The Search-driven Query Formulation 716 enables search queries which take the context of a user's query and then returns the best suggestion for the user's context. These can return several types: tables, columns, expressions, predicates, schema and so on. They take as input a partial query context including the characters that the user just typed to filter suggestions appropriately.

Consequently, two types of indexes are build: a standard inverted index for keyword search, and a trie-based index structure to search for relevant candidates based on prefixes. The number of times a trie-based index is accessed by a single user editing or authoring a single query is very high. In order to avoid the network latency and the consequent deterioration in experience, a trie index is created for each schema. For a given user, we understand the frequently used schema and then ship those trie indexes first to the user so that they can start receiving relevant suggestions almost immediately.

FIG. 8 illustrates an exemplary query associated with each of the objects in the query, according to the embodiments as disclosed herein. The objects in the query are tables, columns, filters, join predicates, derived columns, values and so on.

System Block Diagram

Figure 9:
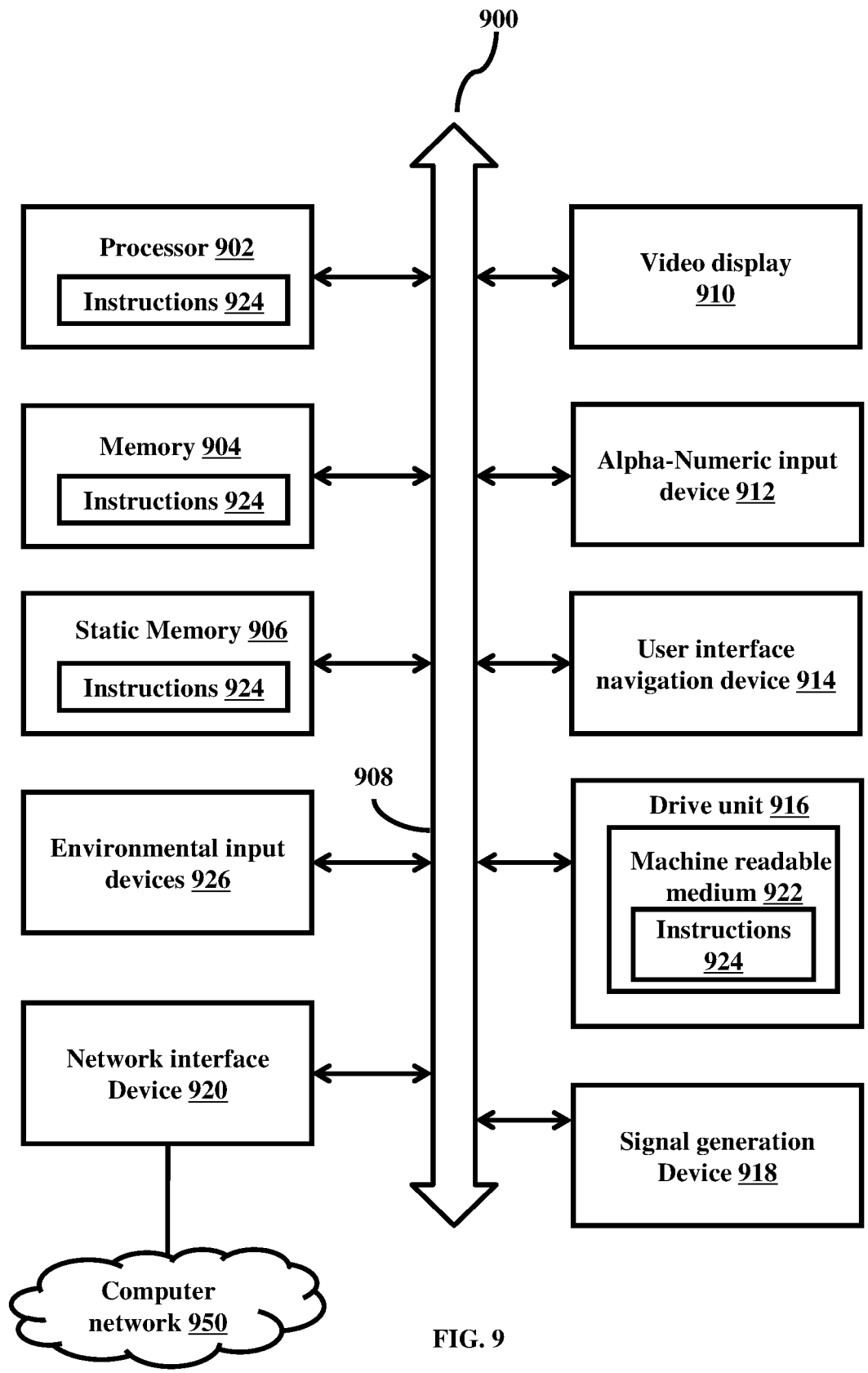
FIG. 9 is a block diagram of a machine in the example form of a computer system within which instructions for causing the machine to perform any one or more of the methodologies discussed herein may be executed.

FIG. 9 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a wearable computing device, a computing device connected to a display that can understand human gestures, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920. The computer system 900 may also include an environmental input device 926 that may provide a number of inputs describing the environment in which the computer system 900 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 924 may further be transmitted or received over a computer network 950 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone Service (POTS)

networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, Objective C, Swift, C++, C#, Pascal, Fortran, Perl, Matlab (from Math Works), SAS, SPSS, JavaScript, Python, Ruby, Ruby on Rails, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, ac, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for searching over queries, writing and performing a data query, the method, performed by a processor configured within a computing device, comprising:
    extracting elements described in the query, wherein the elements are identified by analyzing the query, wherein the query elements include a keyword and a predicate wherein extracting elements described by the query further comprise:
        collecting queries into a catalog and analyzing the queries, the queries being collected from a query editor and system query logs,
        generalizing a search beyond logged queries,
        matching queries to keywords used by users, and
        ranking queries and query templates by relevance;
    instantiating the predicate by inserting keywords and values;
    identifying alternate names, wherein identifying the alternate names comprises extracting aliases for expressions;
    allowing a user to annotate the elements;
    establishing whether the query contains content for defining a query syntax; and
    writing a new query according to a shorthand system in case the query contains content for defining the query syntax.

2. The computer-implemented method of claim 1, wherein a given entry at a given point is a function of (i) the user's data entry and (ii) the syntax of the query up to the given point.

3. The computer-implemented method of claim 1, wherein the elements include schema, tables, attributes, attribute values, predicates, and expressions described in the query.

4. The computer-implemented method of claim 1, wherein the analyzing includes, for a given query attribute, looking up attributes which are joined with the given query attribute.

5. The computer-implemented method of claim 1, further comprises creating a new template by modifying the query, wherein the new template is created by replacing at least one of literals with a variable and selectively retaining other literals within the query.

6. The computer-implemented method of claim 1, wherein the matching queries to keywords includes document preparation by adding, to the query, titles and descriptions of data objects, and tokens in names and titles.

7. The computer-implemented method of claim 1, wherein the ranking includes using token weights and query weights.

8. The computer-implemented method of claim 1, further comprising generating and logging a new template.

9. A computer program product stored on a non-transitory computer-readable medium that when executed by a processor, performs a method for searching over queries, writing and performing a data query, comprising:
extracting elements described in the query, wherein the elements are identified by analyzing the query, wherein the query elements include a keyword and a predicate, and wherein extracting elements described by the query further comprise:
collecting queries into a catalog and analyzing the queries, the queries being collected from a query editor and system query logs,
generalizing a search beyond logged queries,
matching queries to keywords used by users, and
ranking queries and query templates by relevance;
instantiating the predicate by inserting keywords and values;
identifying alternate names, wherein identifying the alternate names comprises extracting aliases for expressions;
allowing a user to annotate the elements;
establishing whether the query contains content for defining a query syntax; and
writing a new query according to a shorthand system in case the query contains content for defining the query syntax.

10. The computer program product of claim 9, wherein a given entry at a given point is a function of (i) the user's data entry and (ii) the syntax of the query up to the given point.

11. The computer program product of claim 9, wherein the elements include schema, tables, attributes, attribute values, predicates and expressions described in the query.

12. The computer program product of claim 9, wherein the analyzing includes, for a given query attribute, looking up attributes which are joined with the given query attribute.

13. The computer program product of claim 9, further comprises creating a new template by modifying the query, wherein the new template is created by replacing at least one of literals with a variable and selectively retaining other literals within the query.

14. The computer program product of claim 9, wherein matching queries to keywords includes document preparation by adding, to the query, titles and descriptions of data objects, and tokens in names and titles.

15. The computer program product of claim 9, wherein the ranking includes using token weights and query weights.

16. The computer-implemented method of claim 9, further comprising generating and logging a new template.

17. A system for searching over queries, writing and performing a data query, the system comprising:
a computing device;
a receiving module to receive a query written by a user of the computing device;
a processor configured within the computing device to:
extract elements described in the query, wherein the elements are identified by analyzing the query and wherein the query elements include a keyword and a predicate, and wherein in order to extract the elements described by the query, the processor is configured to:
collect queries into a catalog and analyze the queries, the queries being collected from a query editor and system query logs,
generalize a search beyond logged queries,
match queries to keywords used by users, and
rank queries and query templates by relevance;
instantiate the predicate by inserting keywords and values;
identify alternate names, wherein the alternate names are identified by extracting aliases for expressions;
allow a user to annotate the elements; and
establish whether the query contains content for defining a query syntax; and
write a new query according to a shorthand system in case the query contains content for defining the query syntax.

18. The system of claim 17 further comprising:
a keyword search user interface to allow users to write data queries and interact with templates;
a data storage device storing data catalogs and corresponding usage by users, the data catalogs includes a source of information;
a smart query editor configured within the computing device to allow users to edit and write queries;
a search engine, wherein the search engine is configured to search and identify items in the data storage device that correspond to keywords and characters specified by a user; and
an analyzing module configured within the computing device to analyze extracted query logs.

* * * * *